United States Patent
Wiley

[11] Patent Number: 5,169,040
[45] Date of Patent: Dec. 8, 1992

[54] DRIPLESS SPOUT HAVING A V-SHAPED CHANNEL

[76] Inventor: Lee A. Wiley, 1185 Sunset Drive, Fenwick, Ontario, Canada, L0S 1C0

[21] Appl. No.: 833,864

[22] Filed: Feb. 11, 1992

Related U.S. Application Data

[63] Continuation of Ser. No. 536,923, Jun. 12, 1990.

[51] Int. Cl.⁵ .......................... B65B 5/74; B65B 25/40
[52] U.S. Cl. ..................................... 222/571; 222/108
[58] Field of Search ....................... 222/571, 108, 109; 215/100.5

[56] References Cited

U.S. PATENT DOCUMENTS

| | | | |
|---|---|---|---|
| 843,443 | 2/1907 | Cox | 222/571 |
| 1,512,964 | 10/1924 | Willis | 222/571 |
| 1,878,996 | 9/1932 | Achtziger | 222/109 |
| 1,925,913 | 9/1933 | Wood | 222/571 |
| 2,057,745 | 10/1936 | Scheyer | 222/571 X |
| 2,442,047 | 5/1948 | Kemper | 222/571 |
| 2,566,527 | 9/1951 | Lilly | 222/571 |
| 2,587,344 | 2/1952 | Livingstone | 222/571 X |
| 2,704,170 | 3/1955 | Ray | |
| 2,834,497 | 5/1958 | Wolf | 222/571 |
| 3,074,604 | 1/1963 | Baroud | 222/192 X |
| 3,549,062 | 12/1970 | Teeter | |

FOREIGN PATENT DOCUMENTS

| | | | |
|---|---|---|---|
| 827237 | 7/1949 | Fed. Rep. of Germany | 222/571 |
| 102282 | 8/1941 | Norway | 222/571 |
| 215632 | 10/1941 | Switzerland | 222/571 |
| 187846 | 11/1922 | United Kingdom | 222/571 |
| 251887 | 5/1926 | United Kingdom | 222/571 |
| 352708 | 7/1931 | United Kingdom | 222/571 |

Primary Examiner—Andres Kashnikow
Assistant Examiner—Kenneth DeRosa
Attorney, Agent, or Firm—Bereskin & Parr

[57] ABSTRACT

A dripless spout comprises a surface having a lip over which a liquid to be poured may flow, and a channel formed in the surface and extending over at least a portion of the surface to the lip. At the end of a pouring operation any droplets of liquid remaining on the surface occupy the channel and are held therein. The spout is formed of relatively thin material and may be provided in the form of a spring clip for fitting to a liquid container, or may be formed integrally with a liquid container.

22 Claims, 2 Drawing Sheets

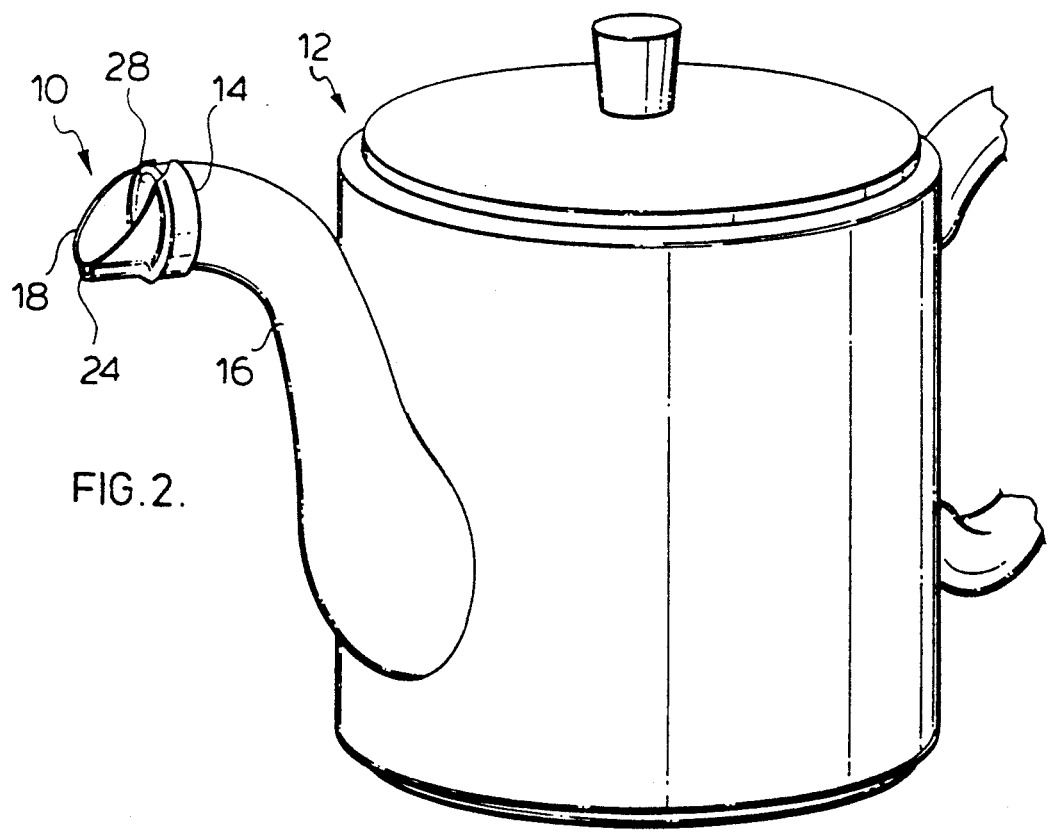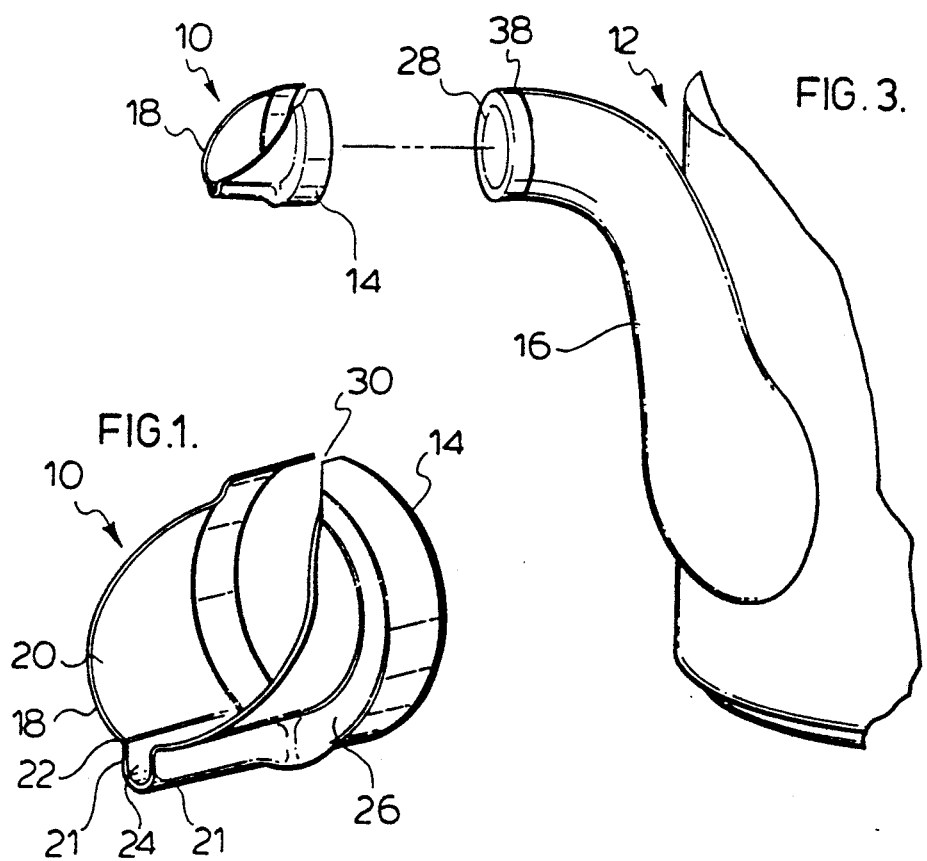

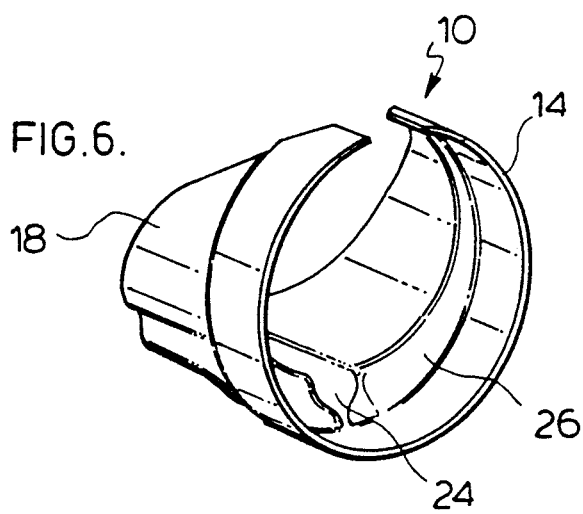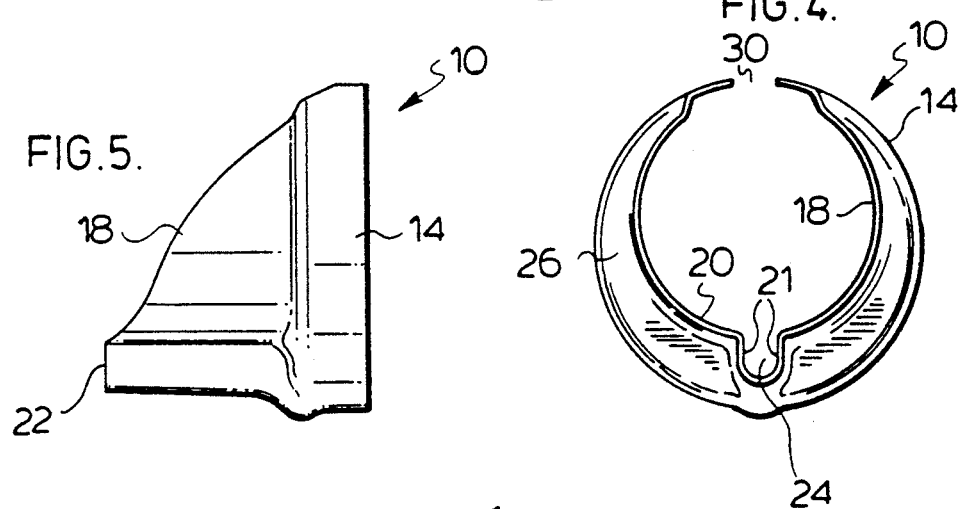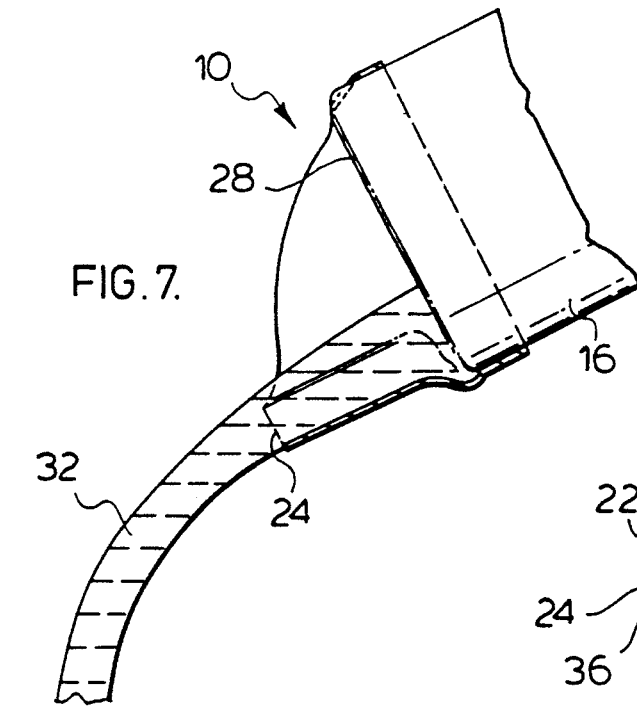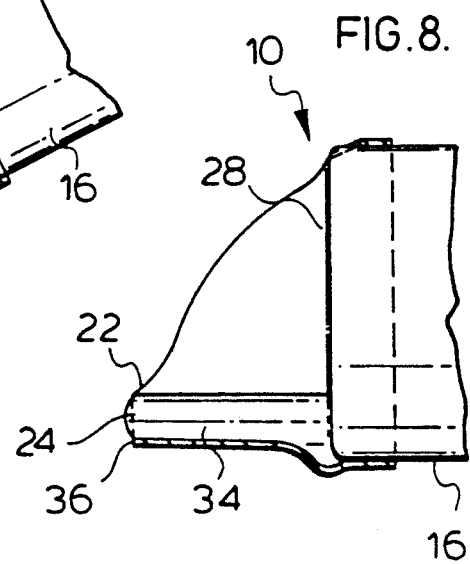

DRIPLESS SPOUT HAVING A V-SHAPED CHANNEL

FIELD OF THE INVENTION

This application is a continuation of U.S. application Ser. No. 07/536,923 filed on Jun. 12, 1990, now abandoned.

This invention relates to a dripless spout which may be formed integrally with a liquid container or adapted for attachment to a liquid container.

BACKGROUND OF THE INVENTION

The pouring spouts of liquid containers are normally intended to provide a smooth flow of liquid through the spout and also to minimize dripping from the spout at the end of the pouring operation. The drips that form on a spout after pouring are undesirable for numerous reasons including wetting and staining of the exterior of the spout and the container, and often wetting or staining of the surface on which the container rests.

Numerous attempts have been made to provide a dripless spout, and it has been generally realized that providing the spout with a thin or sharply cut off lip may enhance the "dripless" characteristics of the spout. This is recognized in U.S. Pat. No. 2,704,170 to Ray, which describes a teapot formed of ceramic material or glass. The spout opening of the teapot is bordered on the sides and bottom by a spout which extends outwardly and curves downwardly. The spout decreases in cross-section towards its extremity and terminates in a relatively sharply defined U-shaped lip undercut or relieved at its backside. U.S. Pat. No. 3,549,062 to Teetor discloses a pouring vessel provided with a droplet retaining structure which retains the droplet normally formed when pouring on a drip retaining lip. The lip is located at the outside of the sidewall at the front of the vessel and slightly below a pouring portion of the sidewall. The lip defines a small recess or pocket between the lip and a pouring portion of the sidewall. The front portion of the lip has a sharp upper edge with the generally vertical outer face and a very restricted horizontal surface. The lip defines a recess of restricted volume whereby the retaining forces, such as surface tension and cohesive and adhesive forces over the liquid, temporarily retain the last drop of liquid in the recess. This drop then flows through a vertical slot in the pouring portion of vessel and runs back into the vessel.

SUMMARY OF THE INVENTION

In the present invention the dripless spout is provided with a channel that extends to the edge or lip of the spout.

According to a first aspect of the present invention, there is provided a dripless spout comprising a surface having a lip over which a liquid to be poured may flow, and a first channel formed in the surface and extending over at least a portion of the surface to the lip. At the end of a pouring operation, the last drop of liquid occupies the channel and is retained therein.

Preferably, the channel is substantially U-shaped and is located in the middle of the surface and extends parallel to the liquid flow over the surface and perpendicular to the lip at the point where the channel meets the lip.

For use in pouring water, it is preferred that, when the spout is formed from metal sheet, most preferably stainless steel sheet, the channel has a mean width of less than about 0.1875 inches, that the thickness of the spout at the lip is less than about 0.03 inches, and that the channel is greater than about 0.25 inches long.

The spout may be formed integrally with a liquid container or pouring vessel or may be provided in the form of a clip for detachably mounting on a liquid container. This latter form of spout is particularly applicable for use with ceramic containers, as it is very difficult to form a spout of the necessary dimensions in ceramic material.

According to a second aspect of the present invention, there is provided a dripless spout comprising a concave surface having a lip over which liquid to be poured may flow, a substantially U-shaped elongate channel being formed in a lower portion of the surface and extending over at least a portion thereof to the lip. The thickness of the lip is less than about 0.015 inches and the channel has a mean width of about 0.09375 inches.

According to a third aspect of the present invention, there is provided a liquid dispenser having a spout opening through which liquid to be poured may flow in combination with a dripless spout. The dripless spout comprises a surface having a lip over which a liquid to be poured may flow and a first channel formed in the surface and extending over at least a portion of the surface to the lip. The dripless spout further includes attachment means for detachably engaging the spout opening of the dispenser.

BRIEF DESCRIPTION OF DRAWINGS

These and other aspects of the present invention will now be described, by way of example, with reference to the accompanying drawings, in which:

FIG. 1 is a perspective view of a dripless spout in accordance with a preferred embodiment of the present invention;

FIG. 2 is a perspective view showing the dripless spout of FIG. 1 mounted on a tea pot;

FIG. 3 is a broken-away view, corresponding to a portion of FIG. 2, and illustrating the mounting operation of the dripless spout of FIG. 1 on a tea pot;

FIG. 4 is a front elevation of the dripless spout of FIG. 1;

FIG. 5 is a side elevation of the dripless spout of FIG. 1;

FIG. 6 is a perspective view from the rear of the dripless spout of FIG. 1;

FIG. 7 is a side view of the dripless spout of FIG. 1 mounted on a tea pot, during a pouring operation; and FIG. 8 illustrates the dripless spout and tea pot portion of FIG. 7 after a pouring operation.

DETAILED DESCRIPTION OF DRAWINGS

Reference is first made to FIG. 1 of the drawings, which illustrates a dripless spout 10 in accordance with a preferred embodiment of the present invention. This particular spout 10 is intended for mounting on a liquid dispensing vessel, such as a tea pot or coffee pot 12, as illustrated in FIGS. 2 and 3 of the drawings. For this reason, the spout configuration illustrated and described is particularly adapted for use in pouring water or other liquids with a viscosity of approximately 1.0 (in the form of tea, coffee, and the like). If the spout is to be used for use in pouring other liquids, such as lubricating oil, the spout configuration would change in view of the different characteristics of the liquid.

As will be described, the trailing portion 14 of the spout 10 is adapted to engage the spout 16 of the tea pot 12, while the leading portion 18 of the spout 10 acts as a liquid-carrying channel. The leading portion 18 therefore includes a surface 20, ending in a lip 22. Formed in the surface 20 is a channel 24 which extends over the leading portion 18 to the lip 22. The surface 20 is formed as part of a cylinder, and thus is concave. The channel 24 extends along a lower portion of the surface 20, from the trailing portion 14. As is best seen in FIG. 4 of the drawings, the channel 24 is substantially 'U' shaped wherein sidewalls 21 are substantially vertical. It has been found that this form of channel, with an absence of sharp corners, which tend to encourage dripping, is most effective. Also, it will be noted that the depth of the channel 24 is substantially similar to the width of the channel. The width of the channel 24 is selected to be similar to the size of a drop of liquid to be poured, in this case water, the drop size being measured by the largest drop that can form just before gravity overcomes surface tension and cohesive forces and a drop forms and falls. Providing a channel 24 of depth equal to the width allows the formation of drops as close as possible to a spherical shape. It is also preferred that the lip of the channel 24 is perpendicular to the longitudinal axis of the channel, as illustrated, as a lip of any other form tends to pull drips around and under the lip.

As may be seen in FIG. 4 of the drawings, the trailing portion 14 is generally circular, like the leading portion 18, and is of somewhat larger diameter than the leading portion 18. As may be seen from FIG. 4, the circumferences of the leading and trailing portions 18, 14 are fairly close to one another towards the top of the spout 10, and are further spaced apart towards the bottom portion of the spout. A transition portion 26 extends outwardly and rearwardly from the leading portion 18 to the trailing portion 14 to form a smooth transition therebetween.

The trailing portion 14 is substantially annular and forms an attachment means for mounting on the spout 16 of the tea pot 12, at the spout opening 28. The trailing portion 14 is not continuous and a gap 30 is formed in the portion 18 at the top thereof. As the spout 10 is formed of a resilient, springy material, preferably stainless steel, the trailing portion 14 may be formed of a slightly smaller diameter than the tea pot spout at the spout opening 28 such that the spout 10 is firmly engaged on the tea pot spout 28.

FIG. 7 and 8 of the drawings illustrate the spout 10 mounted on the tea pot spout 16, FIG. 7 showing water 32 being poured through the spout 10 and the spout 28, and FIG. 8 showing the spout 10 after a pouring operation. As may be seen from FIGS. 2 and 7, the spout 10 is generally oriented on the tea pot spout 28 such that the channel 24 forms the lowermost portion of the spout 10. Thus, when a stream of water 32 is poured through the spout 10, the channel 24 is filled with water, as is the portion of the spout 10 formed by the lower sides of the surface 20. At the end of the pouring operation, the tea pot 12 is brought back to the upright orientation, in which the spout 10 and the channel 24 are substantially horizontal (FIG. 8). As the spout 10 is moved to the horizontal position it is inevitable that some water 34 will remain in the spout 10. In conventional spouts, this water would likely run over the lip 22 and down the tea pot spout 28. However, in this spout 10, the remaining water gathers in the channel 24. While not wishing to be bound by theory, it is believed that the surface tension forces between the channel walls and the washer 34 are sufficient to retain the water in the channel 24.

To prevent dripping it is also important that the lip at the channel 36 is relatively thin. It has been found that, for water at least, the thickness of a stainless steel spout at the lip of the surface and the channel should be less than about 0.03 inches. Preferably the thickness of the spout and the lip of the surface at the channel is between about 0.01 and 0.02 inches, and most preferably, the thickness of the spout at the lip of the surface at the channel is about 0.019 inches. It has also been found that the length of the channel 24 affects the drip retaining qualities of the spout, and, for a stainless steel spout for use with water, it is preferred that the channel 24 is greater than about 0.25 inches long. More preferably, the channel 24 is between 0.25 and 0.5 inches long. Although the cross section shape of the channel 24 may be varied without substantially affecting the dripless quality of the spout 10, it has been found that, for a stainless steel spout for use in pouring water, the channel should preferably have a mean inside width of less than about 0.1875 inches. Most preferably, the channel 24 has a mean inside width of about 0.09375 inches.

A spout 10 having the necessary dimensions may be conveniently formed from sheet metal, such as stainless steel by substantially conventional cutting and stamping operations. It should also be noted that the above-mentioned dimensions are intended for a spout formed of stainless steel. If the spout is to be formed of another material, such as a plastic, the relationship of surface tension forces between the water and the spout will change such that other dimensions may be appropriate.

The dripless spout 10 as described and illustrated with reference to the drawings is intended for use with tea pots or similar articles which are formed in such a way, or of a material which does not permit the provision of a spout of the desired configuration in the material of the tea pot. This would typically apply to ceramic tea pots.

To facilitate secure mounting of the spout 10 on a ceramic tea pot, the tea pot is preferably provided with a resilient washer 38 (FIG. 3) on the end of the tea pot spout 28. The washer 38 may be formed of any suitable material, such as nylon. To provide a mounting for the washer 38 the end of the spout 28 may be provided with an annular indentation.

The present invention thus provides a dripless spout of relatively simple configuration. It will of course be clear to those skilled in the art that the particular configuration described above is merely exemplary of the present invention, and that spouts of various other configurations may be used with equal utility. Further, instead of being detachably mountable on a tea pot or similar article, the dripless spout configuration may be formed integrally with an article, if the article is formed of a suitable material.

I claim:
1. A dripless spout comprising:
  (a) a surface having a lip over which a liquid to be poured may flow; and
  (b) a channel formed in the surface and extending over a pre-determined length and terminating at the lip, said lip also defining the lip of the channel, wherein;
    (i) the channel has a substantially U-shaped cross-section along the entire length;
    (ii) the channel has sidewalls which are substantially vertical and a bottom wall which is con- cavely curved in section transverse to the longitudinal axis of the channel and substantially flat in longitudinal section;

(iii) the height of the channel is substantially equal to the width of the channel;

(iv) the lip of the channel is substantially perpendicular to the longitudinal axis of the channel; and (v) the predetermined length of said channel is sufficient to retain a drop of liquid.

2. The dripless spout of claim 1 wherein all edges of said channel are rounded.

3. The dripless spout of claim 2 for use with a liquid having a viscosity of approximately 1.0 and wherein the spout is formed of metal sheet.

4. The dripless spout of claim 2, for use with a liquid having a viscosity of approximately 1.0 and wherein the thickness of the spout at the lip of the surface at the channel is less than about 0.03 inches.

5. The dripless spout of claim 4 wherein the thickness of the spout at the lip of the surface of the channel is less than 0.02 inches.

6. The dripless spout of claim 5, wherein the thickness of the spout at the lip of the surface of the channel is between about 0.01 and 0.02 inches.

7. The dripless spout of claim 6, wherein the thickness of the spout at the lip of the surface of the channel is about 0.019 inches.

8. The dripless spout of claim 2, wherein the surface is concave, the channel means being located at a lower portion of the surface.

9. The dripless spout of claim 4, wherein the channel is greater than 0.25 inches long.

10. The dripless spout of claim 9, wherein the channel is between about 0.25 and 0.5 inches long.

11. The dripless spout of claim 10, wherein the channel has a mean inside width of less than about 0.1875 inches.

12. The dripless spout of claim 11, wherein the channel has a mean inside width of about 0.09375 inches.

13. The dripless spout of claim 2, wherein the spout includes attachment means for mounting the spout on a liquid container.

14. The dripless spout of claim 13, wherein the attachment means is in the form of a means for resiliently engaging the spout.

15. The dripless spout of claim 14, wherein the attachment means is in the form of a spring clamp adapted to engage a corresponding mounting portion of a liquid container, and is integral with the surface.

16. The dripless spout of claim 15, wherein the spout is formed of stainless steel sheet.

17. The dripless spout of claim 1 for use with a liquid having a viscosity of approximately 1.0 and wherein the spout is formed of metal sheet, the thickness of the lip being about 0.019 inches and the channel having a mean width of about 0.09375 inches.

18. A liquid dispenser having a spout opening through which liquid to be poured may flow in combination with the dripless spout of claim 1 and the spout including attachment means for releasably engaging the dripless spout over the spout opening of the dispenser.

19. The liquid dispenser and dripless spout of claim 18, wherein the attachment means is formed of a spring clip and includes an internal clamping surface for engaging an external surface of the liquid dispenser.

20. The liquid dispenser and dripless spout of claim 19, wherein the dripless spout is formed of a resilient material and the attachment means is formed integrally of the spout.

21. The liquid dispenser and dripless spout of claim 20, wherein the liquid dispenser is formed of a substantially rigid material and a resilient washer means is provided on the spout thereof for facilitating the formation of a seal with the attachment means.

22. The liquid dispenser and dripless spout of claim 20, wherein said surface and said internal clamping surface of the dripless spout are substantially annular.

* * * * *